April 13, 1937.  E. A. REED  2,077,265
LIFT TRUCK
Filed Nov. 15, 1935
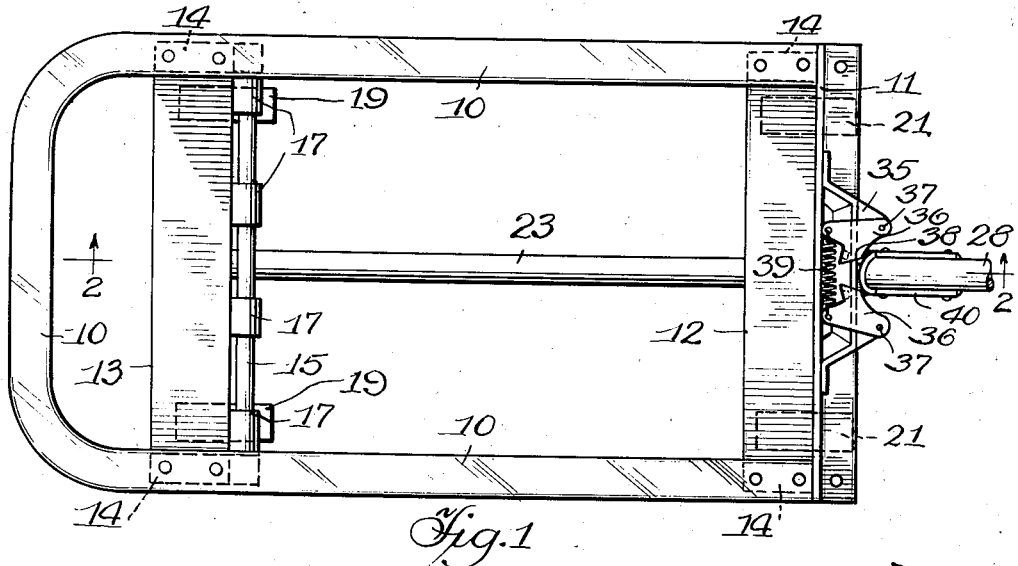
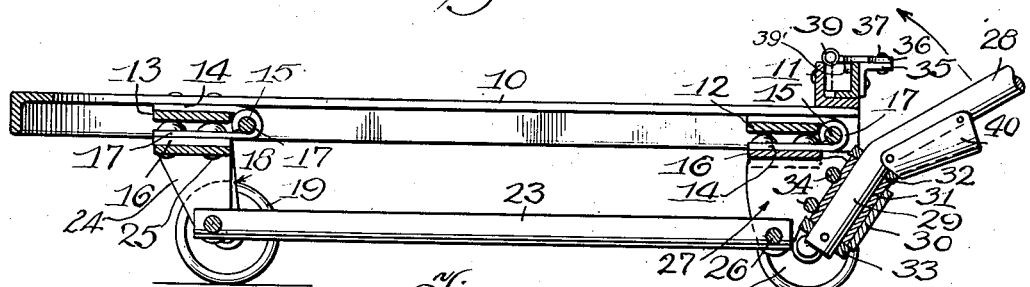
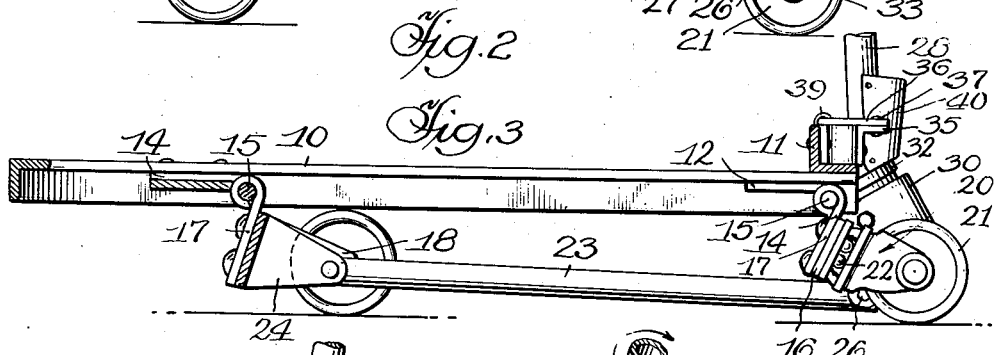
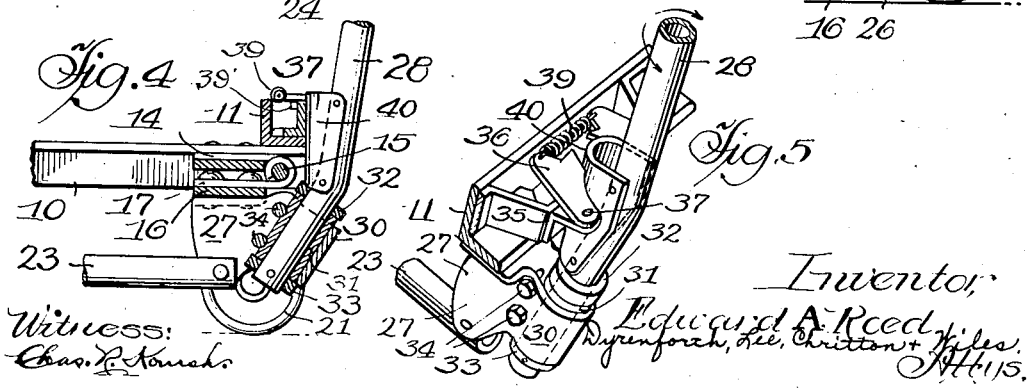
Inventor,
Edward A. Reed Patented Apr. 13, 1937

2,077,265

UNITED STATES PATENT OFFICE 2,077,265

LIFT-TRUCK

Edward A. Reed, Chicago, Ill., assignor to Harris and Reed Manufacturing Company, Chicago, Ill., a corporation of Illinois Application November 15, 1935, Serial No. 50,012

13 Claims. (Cl. 280—46)

My invention relates to improvements in lift-trucks. Most lift-trucks, as constructed heretofore, are provided with two frames one of which is relatively movable with respect to the other. The main frame is carried by the wheels and the auxiliary frame which carries the load is so mounted with respect to the main frame that upon actuation of a lever or handle, said auxiliary frame may be lifted somewhat or may be restored to its lowermost position.

My invention is directed more particularly to a lift-truck in which only one main frame is provided, the auxiliary frame being dispensed with and the main frame being so mounted with reference to the wheels beneath it that it may be swung rearwardly and downwardly to load it and may be swung forwardly and upwardly to lift the load off the supports on which it rests.

The general object of the invention is to provide a device of this character which is simpler and cheaper than those in use heretofore.

Another object is to provide a lift-truck in which ordinary casters may be employed, one set of casters being of the type equipped with swivel ball bearing raceways whereby the truck may be readily swung around and pulled in any direction, making very sharp turns if necessary.

A further object is to provide a truck in which the casters or other small wheels are hinged to the frame whereby the latter may be easily rocked with reference to its supporting wheels to lower it or raise it.

An additional object is to provide an improved and simplified link and lever mechanism by which the raising and lowering of the loaded truck is easily accomplished by swinging a handle which exerts a powerful leverage.

Another object is to provide a truck of this type with front and rear hinged casters connected by link mechanism with a handle mounted on said link mechanism to rock all of said casters simultaneously and to turn the truck from side to side.

A further object is to provide a latching device for the handle and to accomplish this latching operation merely by rotating said handle about its longitudinal axis.

In the accompanying drawing I have illustrated one embodiment of the invention.

Fig. 1 is a top plan view of the device;

Fig. 2 is a section on the line 2—2 of Fig. 1;

Fig. 3 is a somewhat similar section but with the swivel socket for the handle, and the front casters, shown in elevation, and with said handle swung to uppermost position to drop the frame to its lowermost position.

Fig. 4 is a partial sectional view of the front end of the lift-truck with the handle held or latched in uppermost position; and Fig. 5 is a perspective view of the parts shown in Fig. 4.

The lift-truck selected to illustrate the novel features is provided with a main frame, which, as shown in Fig. 1, is generally rectangular although it is made of a U shaped angle iron 10, the front ends of which are connected by a transverse angle iron 11. This frame constitutes the supporting base or platform, although a flooring in the form of boards or otherwise may, of course, be laid on the frame if desired. The parallel arms of said U shaped member are also connected by transverse metal plates 12 and 13, riveted to the under side of the horizontal flange of the angle iron. At each end of each metal plate, between the plate and the flange, is riveted a strip of metal or strap 14, the forward end of which projects and is bent around in the form of an eyelet, to embrace a transverse rod 15, of which there are two, one near the front and the other near the rear of the frame, as shown in Fig. 2. These eyelets, of which there are two for each rod, receive the ends of the rod and pivotally support the same so that the rod may turn therein.

Each of the transverse plates 12 and 13 and the adjacent cross rod 15 constitute, in effect, part of a hinge, the remaining part of which consists of an additional transverse plate 16 having several straps 17 riveted to it and bent around the rod 15, as shown in Figs. 1 and 2. There are four such straps shown although the number may be varied. As shown more particularly in Figs. 2 and 3, there are two of these hinges, one at the front and one near the rear of the truck. Two caster brackets 18 are riveted to the plate 16 constituting part of the rear hinge. The caster wheels 19 are of the usual form, made, for example, of metal, and may be equipped with rubber tires if desired. These rear casters, which are of the so-called "rigid" type, do not swivel but are in fixed position parallel to the sides of the main frame or platform. A second pair of caster brackets 20 are riveted to the front hinged plate 16 and are of the well known swivel type construction equipped with ball bearing swivel raceways 22, of conventional form, whereby the caster wheels may pivot freely about an axis which is normally vertical. The brackets 20 of the front casters are normally inclined to the rear, whereas the brackets 18 of the rear casters are inclined forwardly in fixed position.

With the arrangement of front and rear hinged plates to which the front and rear casters are secured, said casters may be swung up toward the under side of the frame or folded part way under the same, as shown in Fig. 3. Otherwise expressed, the said frame may be swung rearwardly and downwardly to lower it, as the casters rest on the floor and do not swing except in a relative sense.

In order to insure simultaneous swinging movement of the front and rear casters with reference to the frame, they are connected indirectly by a spacer or tie rod 23, which is pivoted at the rear end to a bracket 24 riveted to the hinged plate 16 at 25, and in like manner is pivoted at its forward end at 26 to a somewhat different form of bracket 27 which is riveted to the corresponding hinged plate 16. When the front bracket 27 is swung, relatively to the frame, from the position shown in Fig. 2 to the position shown in Fig. 3, the rear casters swing through substantially the same angle as the front casters. Prior to this lowering of the frame, the front swivel casters are caused to turn half way around, about their vertical axes, as hereinafter explained, so that their brackets 20 incline forwardly, after the manner of the rear caster brackets 18, instead of rearwardly.

The swinging movement of the frame or folding under of the casters, is accomplished by a rod or handle 28 which may have any suitable hand hold at its forward or upper end (not shown). The rear or lower portion of said handle is bent, as shown in Fig. 2, the lower end 29 being arranged to swivel within the cylindrical portion 30 of the bracket 27. Said lower end turns in a bushing 31 received within said cylindrical portion and is confined against end movement by collars 32, 33 above and below said bushing. The cylindrical housing 30 is formed by bending the metal of which the bracket 27 is formed, and clamping the same around the bushing by bolts 34.

From the foregoing description it will be seen that in order to lower the platform, all that is necessary is to maneuver the front of the truck slightly to one side and then rearwardly to cause the front casters to swing around so that their brackets incline forwardly, if they do not happen to be in this position, and then swing the handle 28 upwardly as far as possible, as indicated by the arrow in Fig. 2, the position then assumed by the handle being shown in Fig. 3, further movement being obstructed by the transverse angle iron 11 and more particularly by the bracket 35 riveted thereto, and associated parts, as shown in Fig. 1. In this position, slightly beyond a vertical position, the weight of the frame and of whatever load may be carried thereon, tends to hold the handle and also the casters and connecting link in the positions shown. Thus, assuming that the truck is unloaded, it may be pushed under the load, which latter may, for example, be a heavy piece of machinery or a box or any object longer than the width of the lift-truck, which load is assumed to be supported on opposite sides of the lift-truck at a height above the floor sufficiently to enable the lift-truck to be pushed under it. Such trucks are used to great extent in lifting platforms which are equipped with four steel legs of a height just sufficient to permit the lift-truck to be conveniently pushed under it. These lift-trucks have previously been piled high with boxes or other objects to be moved. In order to lift the load off its supports, or to lift the platform with its supports affixed thereto, the handle 28 is swung downwardly to the position shown in Fig. 2, exerting a powerful leverage, after which said handle is used to pull the lift-truck away. Whenever desired, the handle may be rotated a half turn in either direction to lock it against accidental movement, as by striking it. With a load on the truck, the caster brackets remain vertical as the pivotal axes 17 of the two hinges are not only above but are slightly forward of the axes of the caster wheels, as shown in Fig. 2, as a result of which the weight of the load on the truck tends to hold the casters with their brackets in upright position and prevents them folding under the truck as in the position shown in Fig. 3.

The locking device may be made in various ways and, in the preferred form, is mounted on the bracket 35 and consists of two plates 36, 36, each mounted to swing about a vertical post 37, each plate being cut out at 38 to form a notch between said plates. A spring 39 normally draws the plates toward each other but they may be separated by pressure exerted rearwardly in the notch. A stop 39' on the under side of each plate limits the movement of said plates toward each other against the action of the spring. The latching of the handle 28 is effected in a simple manner by a projection 40 on the handle which may have the form of a rounded lock formed of a bent piece of sheet metal riveted to said handle and of such a size as to snap into the notch 38 when said handle is twisted through a half turn. In this position of the handle, which is shown in Figs. 4 and 5, it is locked against accidental movement and the caster brackets are thereby locked in vertical position. Also, the truck may be pulled, or preferably pushed, by means of the handle which is held rigidly in a position which is nearly upright, although inclined forwardly somewhat, as shown in Fig. 4. To release the handle, all that is necessary is to twist it in either direction to force the lug 40 out of the restraining notch and let it swing down to its lowermost position, or to a convenient angle for pulling the truck from one location to another.

In discharging the load it will be understood, of course, that the frame is lowered by swinging the handle upwardly, whereby the load, which projects beyond the sides of the lift-truck, may be received on blocks or other supports of the proper height, after which said truck with its frame in lowermost position, and its handle vertical, is pulled out from under said load.

The swivel front casters permit great freedom of movement of the lift-truck, particularly in turning, as the front of the truck may be pulled to one side or the other along the arc of a circle, about a point between the rear wheels as the center, if such a short turn is necessary. In other words, the truck can be turned in its own length. The provision of a single frame instead of the two relatively movable frames frequently provided heretofore and the use of ordinary casters, effect a substantial economy in manufacture.

It will be seen that the swivel socket on the lower end of the handle is secured to the front one of the two hinges and therefore said hinge is swung open and closed directly by the handle as an actuating lever and without intervening links. The tie rod connection between the front and rear hinges causes both hinges to open and close together. Said swivel socket is inclined and the bend in the handle is located just above said socket, with the result that the handle bends away from the stop or spring latch on the front of the truck frame. Said handle, therefore, swings through a greater angle before it strikes said stop than if it were straight.

The projection or abutment 40 on said handle is preferably of triangular outline in side elevation and when the handle is rotated about the longitudinal axis of the swivelled lower end, said abutment fills the intervening space between the handle, (which is bent upwardly in this position) and the stop in the form of the spring latch. This abutment is in practical effect mounted on the transverse hinged plate connecting the two front casters. Also, the caster wheels are in practical effect connected to the frame by pivoted links as well as being connected to each other, so that all of the casters may be rocked simultaneously.

The rearward rocking movement to lower the frame is limited by the handle striking the front of the frame, thus preventing said frame from dropping to the floor when it swings to the rear. The swinging movement in the opposite direction is limited by the two plates constituting the main elements of the hinge. This swinging movement of the frame upwardly and forwardly continues past the dead center before the hinges close, i. e. the weight of the parts holds the casters in substantially upright position and prevents accidental dropping of the frame. In the preferred construction shown, the handle, in the position in which it is normally held while pulling the truck, is near the limit of its downward swing, as a result of which the most convenient way for the operator to actuate the handle as a lever is to lift it to lower the truck, and, likewise, it is most convenient to push the handle downwardly in raising the truck and its load as the operator may thus apply his weight to the handle as he pushes it downwardly.

In raising the truck and overcoming the lifting inertia the rolling action of the wheels is of great advantage, i. e. there is a rolling leverage which gives a greatly increased lifting efficiency.

Under some conditions, it may be desirable to reverse the operation described, i. e. to push the handle down to lower the truck and pull it up to lift the load. Under such conditions the hinges would face in the opposite direction whereby the frame would swing forwardly and downwardly to lower it and upwardly and rearwardly to raise it.

Such modification, as well as various other changes in the design and relative arrangement of parts is within the scope of the invention.

I claim:

1. A lift-truck comprising a frame, links pivoted thereto at the front and rear thereof at their upper ends, two front and two rear wheels on which the lower ends of said links are pivotally supported, whereby said frame may be swung downwardly or upwardly about said pivotal supports, means connecting said links to cause them to swing simultaneously and a movable abutment on said means to engage said frame, when in one position of adjustment, and limit said downward swing, and to lock said frame against downward movement when in another position of adjustment.

2. A lift-truck comprising a frame, links pivoted at the front and rear thereof at their upper ends, two front and two rear wheels on which the lower ends of said links are pivotally supported, whereby said frame may be swung downwardly or upwardly about said pivotal supports, means connecting said links to cause them to swing simultaneously, an adjustable stop on said means to engage the front end of said frame and prevent said downward swing, in one of two positions and to permit a limited downward swing in the other position, and means for limiting the swing in the upward direction at a point beyond the top of said swing or dead center, to insure against accidental return movement downwardly.

3. A lift-truck comprising a frame, links pivoted thereto at their upper ends, wheels on which the lower ends of said links are pivotally supported, whereby said frame may be swung downwardly or upwardly about said pivotal supports, means connecting said links to cause them to swing simultaneously, and a handle swivelly mounted on said means and having a stop thereon to engage said frame and prevent movement of said handle in a direction to lower said frame, said stop being rendered operative or inoperative by swivelling said handle with reference to said abutment.

4. A lift-truck comprising a frame, links pivoted thereto on opposite sides at the front and rear thereof, wheels on which the lower ends of said links are pivotaly supported, whereby said frame may be swung downwardly or upwardly about said pivotal supports, transverse members connecting the front links and the rear links, a longitudinal member connecting said transverse members whereby all of said links swing together and means on said front transverse member to rock the same, said rocking means having the form of a handle with its lower end at an angle to its upper end, and having said lower end mounted to rotate about its longitudinal axis in an inclined socket in said front transverse member, whereby, when said handle is swung upwardly it may engage the front of said frame, the extent of such swinging movement being more restricted in one position of rotation of said handle with respect to said socket, than in another position.

5. A lift-truck comprising a supporting structure, axles beneath the same connected thereto by pivoted links, whereby said structure may be raised or lowered by swinging said links about said axles, a handle connected to said links for causing such swinging movement and mounted to rotate about its longitudinal axis, and cooperating means on said structure and handle for limiting said swinging movement and rendered effective or ineffective by rotating said handle about said longitudinal axis.

6. A lift-truck comprising a supporting structure, axles beneath the same connected thereto by pivoted links, whereby said structure may be raised or lowered by swinging said links about said axles, a handle connected to said links for causing such swinging movement and mounted to rotate about its longitudinal axis, and cooperating means on said structure and handle for limiting said swinging movement in one direction, and rendered effective or ineffective by a part turn of said handle about its longitudinal axis.

7. A lift-truck comprising a substantially rectangular frame, a transverse plate near the front and rear thereof, a second transverse plate hinged to each of said first plates, a pair of casters secured to said rear hinged plate, a pair of swivel casters secured to said front hinged plate, a tie rod connecting said front and rear hinged plates, a socket member secured to said front hinged plate and a handle swivelled in said socket member whereby said handle may be swung toward one side or the other in pulling the truck and whereby it may be swung upwardly to rock all four casters forwardly and upwardly with respect to said frame, and thus lower the same.

8. A lift-truck comprising a substantially rectangular frame, a transverse plate near the front and rear thereof, a second transverse plate hinged to each of said first plates, a pair of casters secured to said rear hinged plate, a pair of swivel casters secured to said front hinged plate, a tie rod connecting said front and rear hinged plates, a socket member secured to said front hinged plate, a handle swivelled in said socket member whereby said handle may be swung toward one side or the other in pulling the truck and whereby it may be swung upwardly to rock all four casters forwardly and upwardly with respect to said frame, and thus lower the same, said handle being arranged to engage the front part of said frame to limit its upward swing and being rotatable about its longitudinal axis.

9. A lift-truck as in claim 8 in which the lower end of said handle is bent, whereby rotation about its longitudinal axis will bring that part of it above said bend closer to the front end of said frame to restrict said upward swing.

10. A lift-truck comprising hinged casters beneath the same, means for rocking all of said casters simultaneously to lower or raise said frame and including an inclined socket member associated with said casters, an inclined lever having its lower end swivelled in said inclined socket, the upper part of said lever being arranged at an angle to said lower end, whereby rotation of said lever will change the angle of inclination of the upper part thereof, and a latch on said frame to engage said upper part in one position thereof, said parts being disengaged when said handle is swung through a half turn about said longitudinal axis.

11. A lift-truck comprising a frame having front and rear casters hinged thereto, said front casters being swivelled, means connecting all of said casters whereby they may be rocked about their hinges simultaneously to lower or raise said frame, an inclined socket member secured directly to said front hinge, a handle having its lower end mounted to rotate in said socket whereby said handle may be swung up and down to rock said casters about their hinges and may be turned from one side to the other to pull said lift-truck in any direction, said handle having a projection thereon above said socket member and a spring latch mounted on the front of said frame to be engaged by said projection when said handle is rotated in its socket, said projection, when in latched position, serving to prevent accidental turning movement of said handle in its socket.

12. A lift-truck comprising a frame, two hinges beneath the same one near the front and the other near the rear, each comprising two plates, one plate in each case being secured to said frame, supporting brackets on the other plate in each case, a wheel mounted in each of said brackets, an actuating lever supported by the front one of said other two plates to swing up and down about the axis of said front hinge, and a link connecting said two plates to rock the same in unison and change the elevation of said frame when said actuating lever is rocked.

13. A lift-truck comprising a rectangular frame, two pairs of hinged plates secured transversely of said frame, one pair being secured beneath the front margin of said frame and the other pair being secured beneath the rear part of said frame, one plate of each hinged pair being fastened directly to the side members of said frame at the ends of each plate with the other plate arranged to swing downwardly and forwardly, relatively to said frame, the lower plate of the rear hinged pair having a pair of rigid type casters secured thereto and the lower plate of the front hinged pair having a pair of swivel type casters secured thereto, a handle mounted on said lower front plate, and a connecting member from said front lower plate to said lower rear plate, whereby said casters may be swung forwardly simultaneously to lower said frame by the rocking of said handle rearwardly.

EDWARD A. REED.